(12) United States Patent
Satake

(10) Patent No.: US 10,960,775 B2
(45) Date of Patent: Mar. 30, 2021

(54) DC/DC CONVERSION UNIT

(71) Applicant: Yazaki Corporation, Tokyo (JP)

(72) Inventor: Shuuji Satake, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 39 days.

(21) Appl. No.: 16/389,325

(22) Filed: Apr. 19, 2019

(65) Prior Publication Data

US 2019/0366856 A1 Dec. 5, 2019

(30) Foreign Application Priority Data

May 31, 2018 (JP) .............................. JP2018-104791

(51) Int. Cl.
*B60L 50/60* (2019.01)
*B60L 50/51* (2019.01)

(52) U.S. Cl.
CPC .............. *B60L 50/60* (2019.02); *B60L 50/51* (2019.02); *B60L 2210/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0003223 A1* | 1/2011 | Saeki | ................ | H01M 8/04955 429/432 |
| 2011/0310646 A1* | 12/2011 | Humphrey | .......... | H02M 3/1584 363/126 |
| 2012/0013196 A1* | 1/2012 | Kim | ........................ | H02J 1/12 307/82 |
| 2012/0123625 A1* | 5/2012 | Ueo | ........................ | B60L 58/12 701/22 |
| 2012/0139337 A1* | 6/2012 | Kim | ........................ | B60L 50/64 307/9.1 |
| 2013/0082523 A1* | 4/2013 | Buchzik | ................... | B60L 1/00 307/10.1 |
| 2013/0241466 A1* | 9/2013 | Mitsuda | .................. | B60L 53/00 320/103 |
| 2013/0306387 A1 | 11/2013 | Katano et al. | | |
| 2014/0159506 A1* | 6/2014 | Kim | .................... | H02M 3/1584 307/126 |

(Continued)

FOREIGN PATENT DOCUMENTS

EP           2 330 728 A1    6/2011
JP         2015-080372 A     4/2015

OTHER PUBLICATIONS

Chenhao Nan, "Optimal Design of a Redundant High Current DC/DC Converter", 2015 IEEE Applied Power Electronics Conference and Exposition (APEC), IEEE, Mar. 15, 2015, pp. 2109-2115 (7 pages total).

(Continued)

*Primary Examiner* — Adam D Houston
(74) *Attorney, Agent, or Firm* — Sughrue Mion, PLLC

(57) ABSTRACT

The two DC/DC converters perform DC/DC conversion of the power source voltage of the driving battery for supplying power to the motor of the vehicle and supply to an automatic operation load and a general load as an electrical component mounted on the vehicle. A switch is connected between the outputs of the two DC/DC converters. The two DC/DC converters and the switch are accommodated in one accommodating case.

4 Claims, 4 Drawing Sheets

(56) References Cited

U.S. PATENT DOCUMENTS

| | | | |
|---|---|---|---|
| 2016/0064726 A1* | 3/2016 | Ikenuma | H01M 4/1393 |
| | | | 429/231.8 |
| 2016/0181835 A1* | 6/2016 | Gross | H01M 10/658 |
| | | | 320/101 |
| 2016/0339788 A1* | 11/2016 | Miftakhov | B60L 53/66 |
| 2017/0274782 A1* | 9/2017 | Nomura | B60L 11/1811 |
| 2017/0274785 A1* | 9/2017 | Kuribara | B60L 50/61 |
| 2017/0274797 A1* | 9/2017 | Kuribara | H02J 7/0047 |
| 2018/0229771 A1* | 8/2018 | Sekine | B60K 1/04 |
| 2019/0016208 A1* | 1/2019 | Tomokage | H02K 7/006 |
| 2019/0168632 A1* | 6/2019 | Deng | B60L 50/64 |
| 2019/0176651 A1* | 6/2019 | King | B60L 53/14 |
| 2019/0263279 A1* | 8/2019 | Kyojo | B60L 58/12 |
| 2019/0322177 A1* | 10/2019 | Shirahashi | B60R 16/03 |
| 2019/0366856 A1* | 12/2019 | Satake | B60L 50/51 |
| 2019/0366861 A1* | 12/2019 | Satake | B60L 3/003 |
| 2019/0389328 A1* | 12/2019 | Blickle | B60L 58/20 |
| 2020/0077530 A1* | 3/2020 | Jung | H02M 7/00 |
| 2020/0119660 A1* | 4/2020 | Takahashi | B60L 53/122 |
| 2020/0143609 A1* | 5/2020 | Neelakantan | G07C 5/0808 |
| 2020/0156476 A1* | 5/2020 | Suzuki | H02J 7/0048 |
| 2020/0189379 A1* | 6/2020 | Hirukawa | B60R 16/0238 |
| 2020/0195020 A1* | 6/2020 | Tanaka | H02J 7/1423 |
| 2020/0205080 A1* | 6/2020 | Okada | B60R 16/0238 |
| 2020/0207227 A1* | 7/2020 | Tan | B60L 53/22 |
| 2020/0227761 A1* | 7/2020 | Yoshida | B60L 53/54 |

OTHER PUBLICATIONS

Bennett et al., "Fault-Tolerant Design Considerations and Control Strategies for Aerospace Drives", IEEE Transactions on Industrial Electronics, vol. 59, No. 5, May 2012, pp. 2049-2058 (10 pages total).

* cited by examiner

OUTPUT CHARACTERISTICS
OF DC/DC

WITH COOPERATIVE CONTROL

OUTPUT CHARACTERISTICS
OF DC/DC

WITH COOPERATIVE CONTROL

DC/DC CONVERSION UNIT

TECHNICAL FIELD

The present invention relates to a DC/DC conversion unit.

BACKGROUND ART

In recent years, in hybrid vehicles and electric vehicles, it has been proposed to provide a high-voltage battery (driving power source) for a drive motor, and a DC/DC converter for converting an output from the high-voltage battery into a voltage corresponding to various electrical components other than the drive motor.

In addition, in order to prevent power supply to the electrical components from being lost due to a failure of the DC/DC converter or the like during the operation of the vehicle, a technique of providing two DC/DC converters has been proposed (Patent Literature 1). In particular, it is an effective technique when the electrical components are related to automatic operation.

However, since the DC/DC converter generates a large amount of heat, if two DC/DC converters are provided, two cooling systems are required, which is a cost problem.

PRIOR ART DOCUMENT

Patent Literature

Patent Literature 1: JP 2015-80372 A

SUMMARY OF INVENTION

Technical Problem

The present invention has been made in view of the above background, and it is an object of the present invention to provide a DC/DC conversion unit with a reduced cost.

Solution to Problem

According to a first aspect of the present invention, there is provided a DC/DC conversion unit including:

two DC/DC converters that convert a power source voltage of a driving power source that supplies power to a motor of the vehicle by DC/DC conversion and supply to an electrical component mounted on the vehicle; and a storage case for housing the two DC/DC converters.

Further, the DC/DC conversion unit may further includes:

two control units that independently control the two DC/DC converters.

Further, the DC/DC conversion unit may further includes:

a switch connected between outputs of the two DC/DC converters, wherein the two control units monitor each other and turn off the switch when detecting failure of any one of the two control units.

Further, the switch may be accommodated in the storage case.

Further, two power sources for electrical components may be respectively provided between the electrical component and the outputs of the two DC/DC converters.

Effect of the Invention

According to the aspect described above, by accommodating two DC/DC converters in one storage case, it is possible to use a common cooling system for the two DC/DC converters, and cost reduction can be achieved.

DESCRIPTION OF EMBODIMENTS

Figure 1:
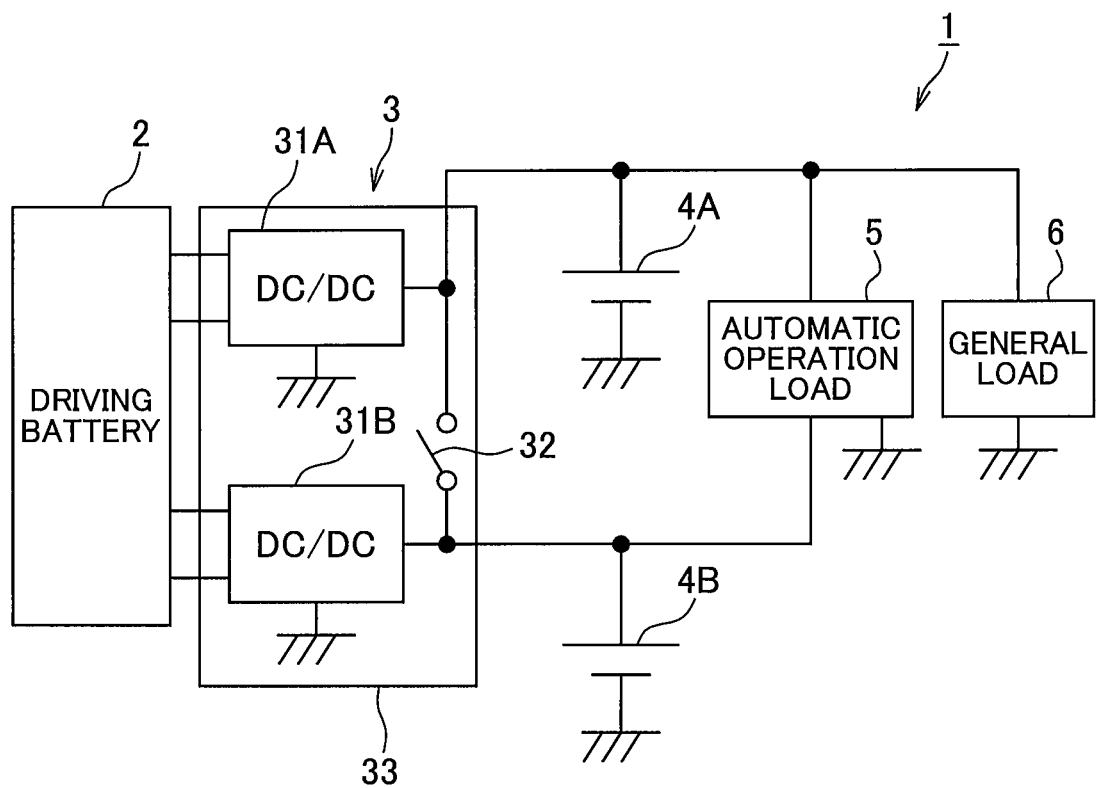
FIG. 1 is a circuit diagram showing one embodiment of a power unit incorporating a DC/DC conversion unit of the present invention.
Figure 2:
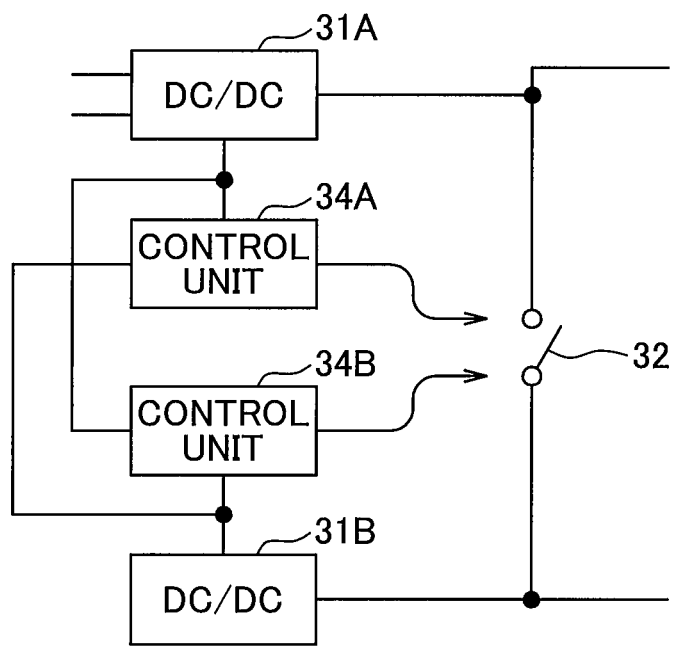
FIG. 2 is a circuit diagram showing further details of the power unit shown in FIG. 1.

Hereinafter, an embodiment of the present invention will be described with reference to FIGS. 1 and 2. The power unit 1 shown in FIG. 1 is mounted on a hybrid vehicle, an electric vehicle, etc. driven by a motor (not shown), and supplies power to an automatic operation load 5 and a general load 6 as electrical components.

As shown in this figure, the power unit 1 includes a driving battery 2 as a driving power supply, a DC/DC conversion unit 3, two first sub-batteries 4A and two second sub-batteries 4B as power supplies for electrical components, the automatic operation load 5, and the general load 6.

The driving battery 2 is a main battery whose main purpose is to drive a motor as a source of power for driving a hybrid vehicle or an electric vehicle. The driving battery 2 is connected to the motor via an inverter circuit (not shown) that converts direct current to alternating current. For this reason, a high-voltage, high-capacity battery is used as the driving battery 2.

The DC/DC conversion unit 3 DC/DC-converts the power source voltage of the high-voltage driving battery 2 and supplies to the low-voltage first sub-battery 4A, the second sub-battery 4B, the automatic operation load 5, and the general load 6. Details of the DC/DC conversion unit 3 will be described later.

The first and second sub-batteries 4A and 4B are sub-batteries whose main purpose is to drive electrical components (automatic operation load 5, general load 6) driven with low voltage other than the motor. For this reason, as the first and second sub-batteries 4A, 4B, batteries of lower voltage and smaller capacity than the driving battery 2 are used.

In addition, the first and second sub-batteries 4A and 4B are separately provided. The first sub-battery 4A is charged with electric power output from the DC/DC conversion unit 3 and supplies electric power to both the automatic operation load 5 and the general load 6. The second sub-battery 4B is charged by electric power outputted from the DC/DC conversion unit 3 and supplies electric power only to the automatic operation load 5. Electric power is not supplied from the second sub-battery 4B to the general load 6.

The first and second sub-batteries 4A and 4B are batteries having the same output voltage. The second sub-battery 4B is an auxiliary battery for continuing power supply to at least the automatic operation load 5 when a power source abnormality occurs in which charging from the DC/DC conversion unit 3 to the first battery 4A is interrupted. As a result, even if the above-described power source abnormality occurs, the vehicle can continue the automatic operation and return to the nearest service base.

In the present embodiment, the second sub-battery 4B supplies electric power only to the automatic operation load 5, and has a smaller capacity than the first sub-battery 4A. Of course, the present invention is not limited to this, the second sub-battery 4B may be configured to be able to supply electric power to both the automatic operation load 5 and the general load 6, and capacities of the first sub-battery 4A and the second sub-battery 4B may be the same.

The automatic operation load 5 is composed of electrical components required for automatic operation, which drive and control at least one of an accelerator, a steering wheel, and a brake. The general load 6 is composed of electrical components which are not necessary for automatic operation such as air conditioner and audio.

Next, the details of the DC/DC conversion unit 3 will be described. The DC/DC conversion unit 3 includes: two DC/DC converters 31A, 31B; a switch 32; a storage case 33 that accommodates these two DC/DC converters 31A, 31B and the switch 32; and two control units 34A, 34B (FIG. 2).

The two DC/DC converters 31A and 31B are well-known DC/DC converters composed of switching elements, coils, and the like, respectively. Each of the two DC/DC converters 31A, 31B steps down the power source voltage of the driving battery 2 and converts it to a voltage suitable for the first and second sub-batteries 4A, 4B, the automatic operation load 5, and the general load 6.

The first sub-battery 4A is connected to the output of the DC/DC converter 31A. The second sub-battery 4B is connected to the output of the DC/DC converter 31B.

The switch 32 is provided between the outputs of the two DC/DC converters 31A and 31B. When this switch 32 is turned on, the outputs of the two DC/DC converters 31A, 31B are connected, the output of the DC/DC converter 31A is connected to the second sub-battery 4B, and the output of the DC/DC converter 31B is connected to the first sub-battery 4A. When the switch 32 is turned off, the outputs of the two DC/DC converters 31A, 31B are disconnected from each other, the output of the DC/DC converter 31A is disconnected from the second sub-battery 4B, and the output of the DC/DC converter 31B is disconnected from the first sub-battery 4A.

The switch 32 is on/off controlled by both of the two control units 34A, 34B (FIG. 2) which will be described later. The control units 34A and 34B turn on the switch 32 in the normal state. As a result, in the normal state, the first sub-battery 4A is charged by both output powers of the two DC/DC converters 31A, 31B and the second sub-battery 4B is also charged by both output powers of the two DC/DC converters 31A, 31B.

On the other hand, when an abnormality occurs in any one of the two DC/DC converters 31A and 31B, the control units 34A and 34B turn off the switch 32. For example, when the switch 32 is turned off upon an occurrence of the abnormality of the DC/DC converter 31A, the connection between the abnormal DC/DC converter 31A and the second sub-battery 4B is disconnected. Thereby, the output voltage of the abnormal DC/DC converter 31A is not supplied to the second sub-battery 4B and the automatic operation load 5, and only the output voltage of the normal DC/DC converter 31B is supplied to the second sub-battery 4B and the automatic operation load 5, so that the power supply to the automatic operation load 5 can be continued.

Similarly, when the switch 32 is turned off upon an occurrence of the abnormality of the DC/DC converter 31B, the connection between the abnormal DC/DC converter 31B and the first sub-battery 4A is disconnected. Thereby, the output voltage of the abnormal DC/DC converter 31B is not supplied to the first sub-battery 4A, the automatic operation load 5, and the general load 6, and only the output voltage of the normal DC/DC converter 31A is supplied to the first sub-battery 4A, the automatic operation load 5, and the general load 6, so that the power supply to the automatic operation load 5 and the general load 6 can be continued.

The two DC/DC converters 31A and 31B are accommodated in one storage case 33. That is, the two DC/DC converters 31 A, 31 B are housed in one space partitioned from the external space by the one storage case 33. Since the two DC/DC converters 31 A, 31 B are housed in the one storage case 33 in this manner, it is possible to use a common cooling system for the two DC/DC converters 31 A and 31 B, so that cost reduction can be achieved.

As the cooling system, a well-known cooling system capable of cooling the temperature inside the storage case 33 may be used. As the cooling system, it is conceivable, for example, to provide a configuration in which a cooling fan for taking outside air into the storage case 33 is provided, or a structure in which a heat exchanger or the like is provided in the storage case 33. In addition, the cooling medium may be a liquid or a gas.

The switch 32 is also accommodated in the one storage case 33. Therefore, by disposing the switch 32 close to the DC/DC converters 31A, 31B, on/off of the switch 32 can be controlled by the control units 34A, 34B, which will be described later, which control the DC/DC converters 31A, 31B. That is, it is unnecessary to provide a control unit for on/off control of the switch 32 separately from the control units 34A, 34B, and cost reduction can be achieved.

The two control units 34 A and 34 B are constituted by, for example, a microcomputer composed of a CPU, a ROM, a RAM, and the like, and independently control the two DC/DC converters 31A and 31B, respectively. "Independently control" means that each of the two control units 34A, 34B is composed of different parts, and means that a microcomputer constituting the control unit 34A, and a microcomputer constituting the control unit 34B are separate parts.

By thus providing two control units 34A and 34B and independently controlling the DC/DC converters 31A and 31B, respectively, even if any one of the control units 34A and 34B fails, it is possible to continue the operation of the corresponding DC/DC converter with the other control unit. Therefore, power supply interruption to the automatic operation load 5 can be prevented.

The control unit 34A performs conversion control of the DC/DC converter 31A, the control unit 34B performs conversion control of the DC/DC converter 31B, so as to be outputted a desired output voltage from the DC/DC converters 31A and 31B. The two control units 34A and 34B may be accommodated in the storage case 33 or outside the storage case 33.

Next, the conversion control performed by the two control units 34A and 34B will be described. The two control units 34A and 34B control the operation of the DC/DC converters 31A and 31B by performing ON/OFF control of the switching elements incorporated in the two DC/DC converters 31A and 31B, respectively.

In the present embodiment, the two control units 34A and 34B start controlling the DC/DC converters 31A and 31B, for example, in response to the turning-on of the ignition switch, but do not start the conversion control at the same time, and the cooperative control shown below is executed. In the cooperative control, firstly, the control unit 34B starts conversion control of the DC/DC converter 31B. At this time, the operation of the DC/DC converter 31A is stopped. Thereafter, when the output power of the DC/DC converter 31B becomes higher to some extent, the other control unit 34A starts the conversion control of the DC/DC converter 31A.

Thereby, when the output power at the start of conversion is low, the operations of the two DC/DC converters 31A and 31B are not executed, so that the efficiency can be improved. Incidentally, the timing of starting the conversion control of the DC/DC converter 31A may be a timing at which the output voltage of the DC/DC converter 31B exceeds the threshold value or may be a timing when a predetermined time elapses from the start of the control of the DC/DC converter 31B.

Figure 3:
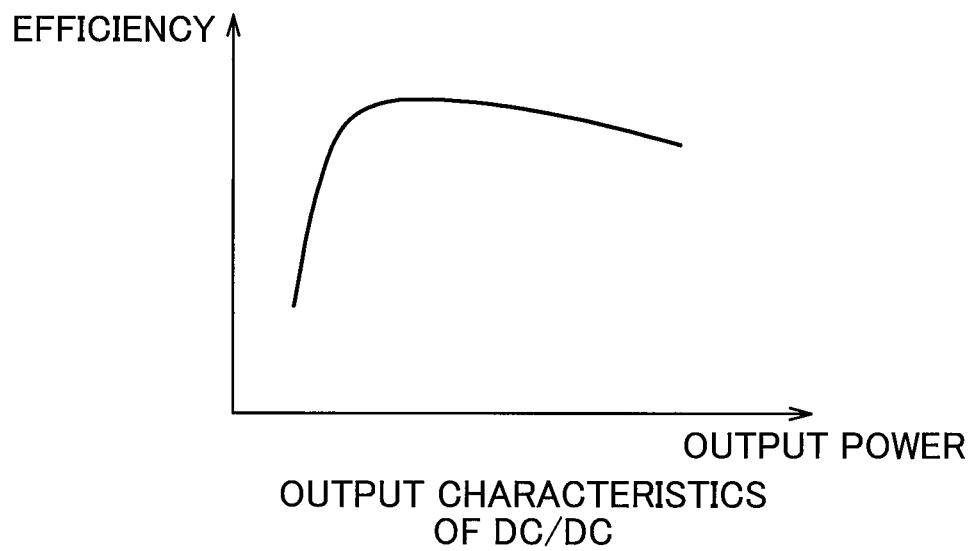
FIG. 3 is a graph showing the relationship between the output power and the efficiency of each of the two DC/DC converters shown in FIG. 1.

The above effect is confirmed by simulation. FIG. 3 is a graph showing the relationship between the output power and the efficiency of each of the DC/DC converters 31A and 31B. The two DC/DC converters 31A and 31B have the same output power versus efficiency characteristic. As shown in this figure, the DC/DC converters 31A and 31B are inefficient while the output power is low, and the efficiency is suddenly improved as the output power is increased. Then, when the output power becomes higher to some extent, the efficiency gradually decreases as the output power increases.

Figure 4:
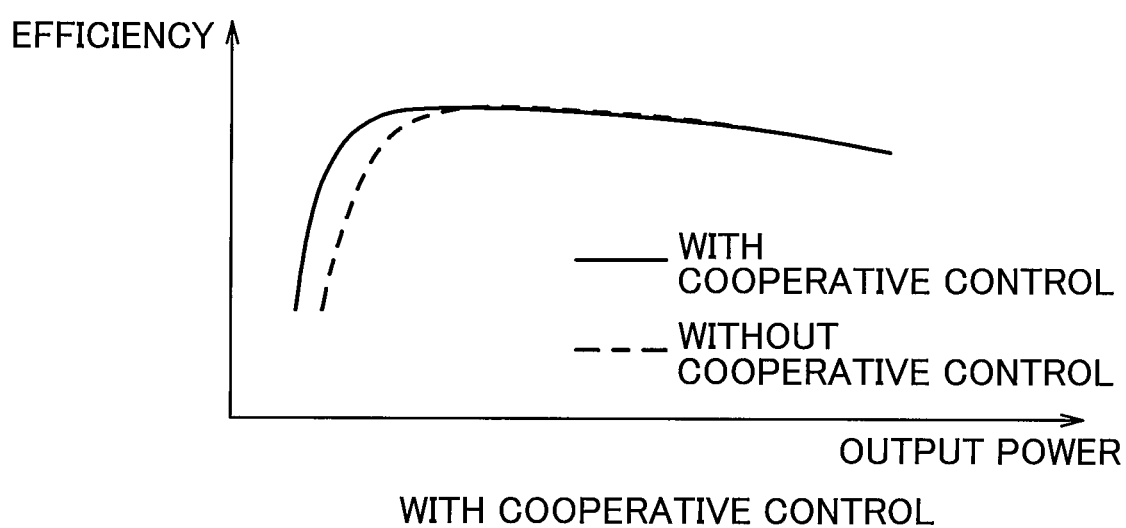
FIG. 4 is a graph showing relationships between the efficiency and respective output powers with cooperative control and without cooperative control on the two DC/DC converters having the characteristics shown in FIG. 3.

The relationship between the efficiency and the output power is simulated in a case that the control units 34A and 34B execute the cooperative control of the DC/DC converters 31A and 31B having the above characteristics, and in a case that the control units 34A and 34B do not execute the cooperative control (that is, in a case that the controls of two DC/DC conversions of the control units 31A and 31B simultaneously start). The results are shown in FIG. 4. It is clear from the figure that it is possible to improve the efficiency when the output power is low by performing the cooperative control.

Figure 5:
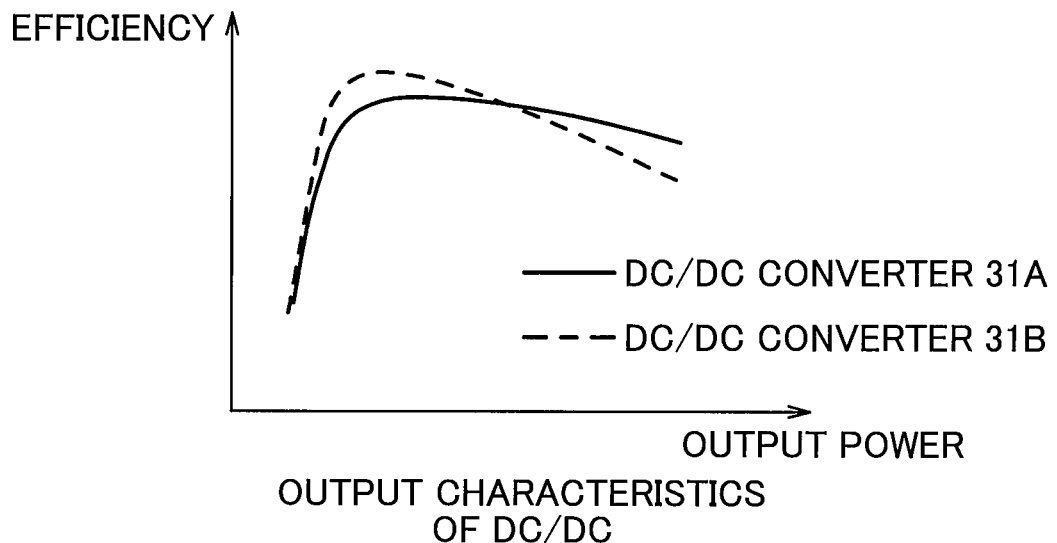
FIG. 5 is a graph showing the relationships between the output power and the efficiency of the two respective DC/DC converters shown in FIG. 1 according to another embodiment.
Figure 6:
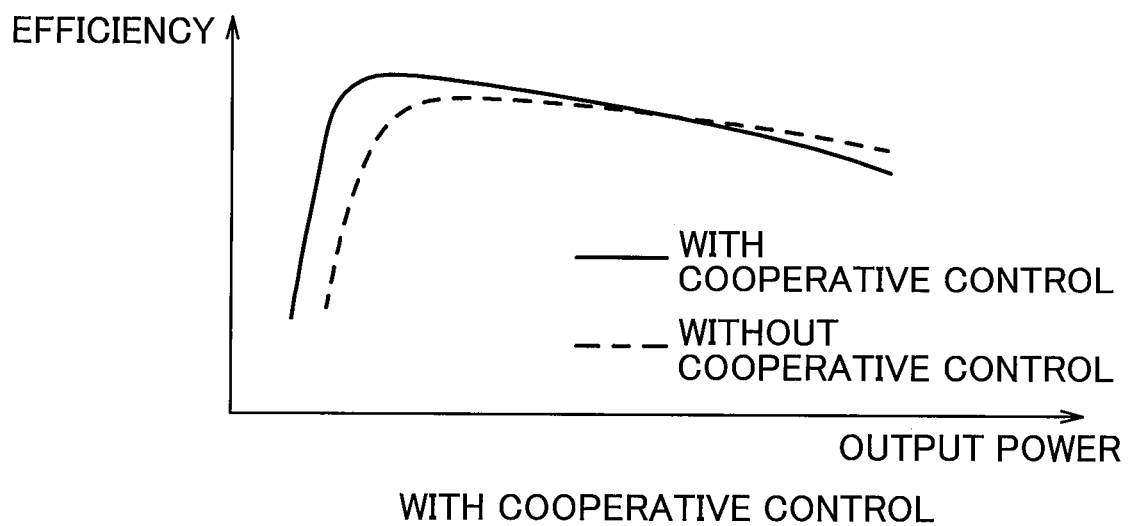
FIG. 6 is a graph showing relationships between the efficiency and respective output powers with cooperative control and without cooperative control on the two DC/DC converters having the characteristics shown in FIG. 5.
Figure 7:
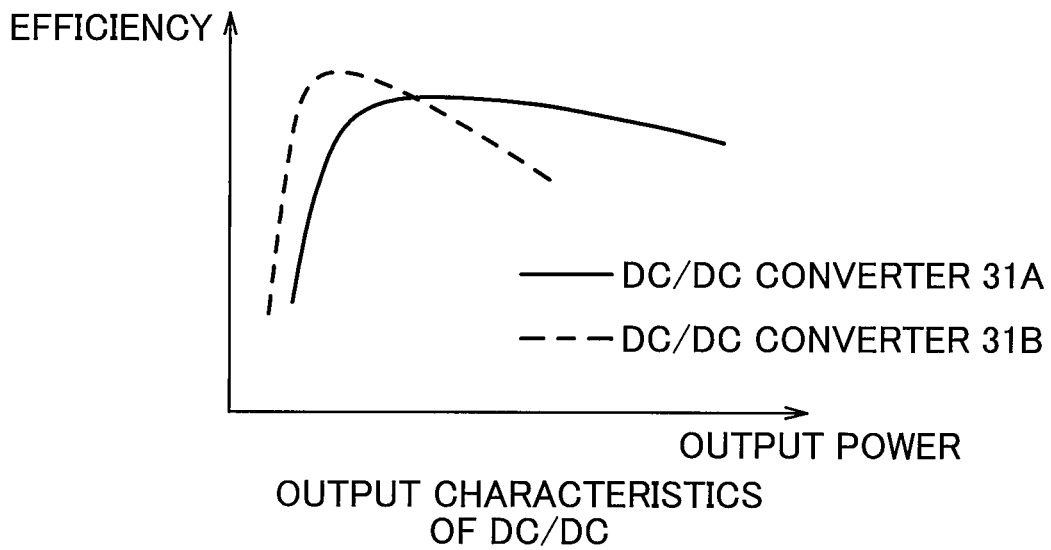
FIG. 7 is a graph showing the relationships between the output power and the efficiency of the two respective DC/DC converters shown in FIG. 1 according to another embodiment.
Figure 8:
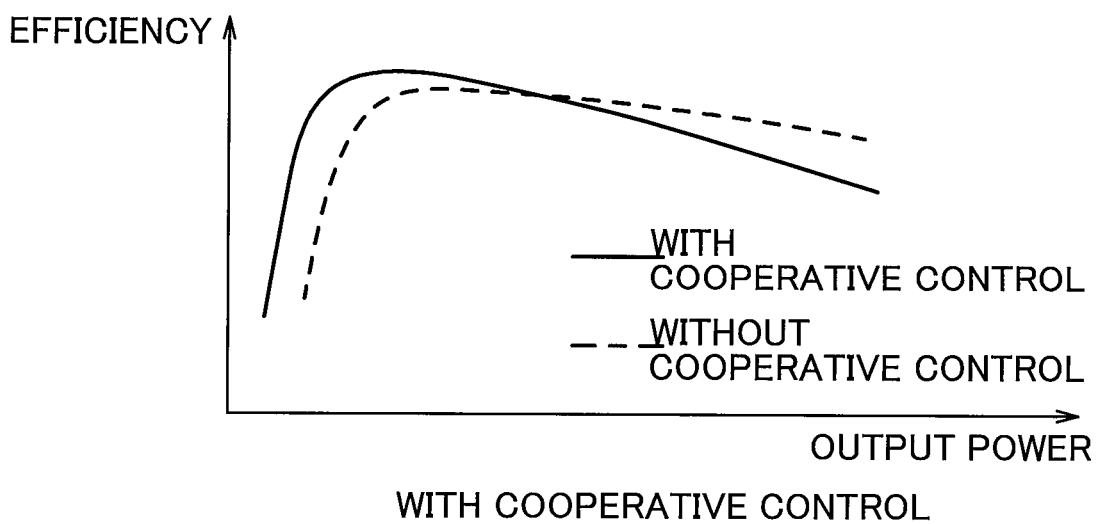
FIG. 8 is a graph showing relationships between the efficiency and respective output powers with cooperative control and without cooperative control on the two DC/DC converters having the characteristics shown in FIG. 7.

According to the above embodiment, the output power versus efficiency characteristics of the two DC/DC converters 31A and 31B are the same, but the present invention is not limited thereto. For example, as shown in FIGS. 5 and 7, the output power versus efficiency characteristics of the two DC/DC converters 31A and 31B may be different. FIG. 6 is a graph showing the relationship of efficiency with respect to respective output powers when cooperative control is performed and cooperative control is not performed with the DC/DC converters 31A and 31B having the characteristics shown in FIG. 5. Further, FIG. 8 is a graph showing the relationship of efficiency with respect to respective output powers when cooperative control is performed and cooperative control is not performed with the DC/DC converters 31A and 31B having the characteristics shown in FIG. 7. As shown in FIGS. 5 and 7, the DC/DC converter 31B has high efficiency when the output power is low, but has poor is when the output power is high as compared with the DC/DC converter 31A.

In this case, when the control units 34A and 34B firstly start the conversion control of the DC/DC converter 31B, which is efficient when the output power is low, and later start the conversion control of the DC/DC converter 31A, which is efficient when the output power is high, as shown in FIGS. 6 and 8, it is possible to further improve the efficiency when the output power is low, as shown in FIGS. 6 and 8.

In addition, the two control units 34A and 34B monitor each other. When any one of the two control units 34A and 34B detects a failure of the other of the two control units 34A and 34B, the one judges that an abnormality occurs in either one of the DC/DC converters 31A and 31B, and turns off the switch 32. The control unit 34A monitors the control signal outputted from itself to the DC/DC converter 31A and the control signal output from the control unit 34B to the DC/DC converter 31B, and when no signal is output from either one, turns off the switch 32.

Likewise, the control unit 34B also monitors the control signal output from itself to the DC/DC converter 31B and the control signal output from the control unit 34A to the DC/DC converter 31A, and when no signal is no longer output from either one, turns off the switch 32.

When the control unit 34A fails, a desired output voltage from the DC/DC converter 31A is not output. In the present embodiment, when the control unit 34A fails, the control units 34A and 34B can turn off the switch 32 and disconnect the abnormal DC/DC converter 31A. The power supply to the second sub-battery 4B and the automatic operation load 5 can be continued by the output voltage from the normal DC/DC converter 31B.

Further, when the control unit 34B fails, the control units 34A and 34B can turn off the switch 32 and disconnect the abnormal DC/DC converter 31B. The power supply to the first sub-battery 4A, the automatic operation load 5 and the general load 6 can be continued by the output from the normal DC/DC converter 31A.

Incidentally, according to the above-described embodiment, the DC/DC converters 31A and 31B are independently controlled by the two control units 34A and 34B, respectively, but the present invention is not limited thereto. The two DC/DC converters 31A and 31B may be controlled by one control unit.

Further, according to the above-described embodiment, the switch 32 is accommodated in the storage case 33, but the present invention is not limited thereto. The switch 32 may be provided outside the storage case 33.

Further, according to the embodiment described above, the power unit 1 is provided with two sub-batteries of the first sub-battery 4A and the second sub-battery 4B, but the present invention is not limited thereto. Only the first sub-battery 4A may be provided.

Further, according to the above-described embodiment, the control units 34A and 34B start the conversion control of the DC/DC converter 31B first and then start the conversion control of the DC/DC converter 31 A, but the present invention is not limited thereto. The conversion control of the DC/DC converter 31A may be started first, and thereafter the conversion control of the DC/DC converter 31B may be started.

It should be noted that the present invention is not limited to the above embodiment. That is, various modifications can be made without departing from the gist of the present invention.

REFERENCE SIGNS LIST

2 Driving battery (Driving power source)
3 DC/DC conversion unit
4A First sub-battery (Power source for electrical components)
4B Second sub-battery (Power source for electrical components)
5 Automatic operation load (Electrical component)
6 General load (Electrical components)
31A, 31B DC/DC converters
32 Switch
33 Storage case
34A, 34B Control units

The invention claimed is:

1. A DC/DC conversion unit comprising:
two DC/DC converters that convert a power source voltage of a driving power source that supplies power to a motor of a vehicle by DC/DC conversion and supply to an electrical component mounted on the vehicle;
a storage case for housing the two DC/DC converters,
two control units that independently control the two DC/DC converters, and
a switch connected between outputs of the two DC/DC converters,
wherein the two control units monitor each other and turn off the switch when detecting failure of any one of the two control units.

2. The DC/DC conversion unit as claimed in claim 1, wherein the switch is accommodated in the storage case.

3. The DC/DC conversion unit as claimed in claim 1, wherein two power sources for electrical components are respectively provided between the electrical component and the outputs of the two DC/DC converters.

4. The DC/DC conversion unit as claimed in claim 2, wherein two power sources for electrical components are respectively provided between the electrical component and the outputs of the two DC/DC converters.

* * * * *